Dec. 31, 1935.   A. G. NORDMARKEN   2,025,821
DISPENSING DEVICE
Filed July 26, 1933   2 Sheets-Sheet 1
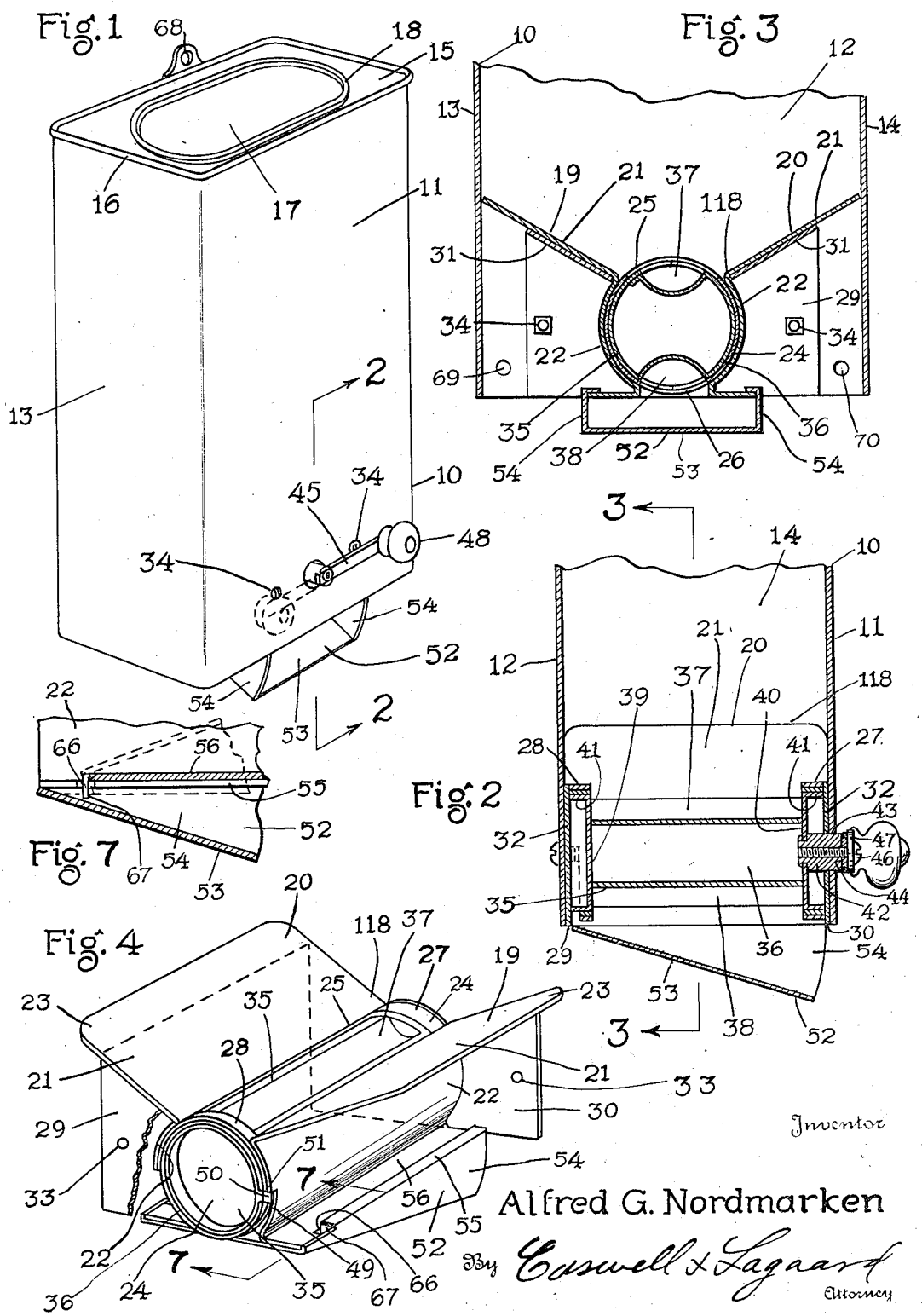
Inventor
Alfred G. Nordmarken
By Caswell & Lagaard
Attorney Dec. 31, 1935.   A. G. NORDMARKEN   2,025,821
DISPENSING DEVICE
Filed July 26, 1933   2 Sheets-Sheet 2
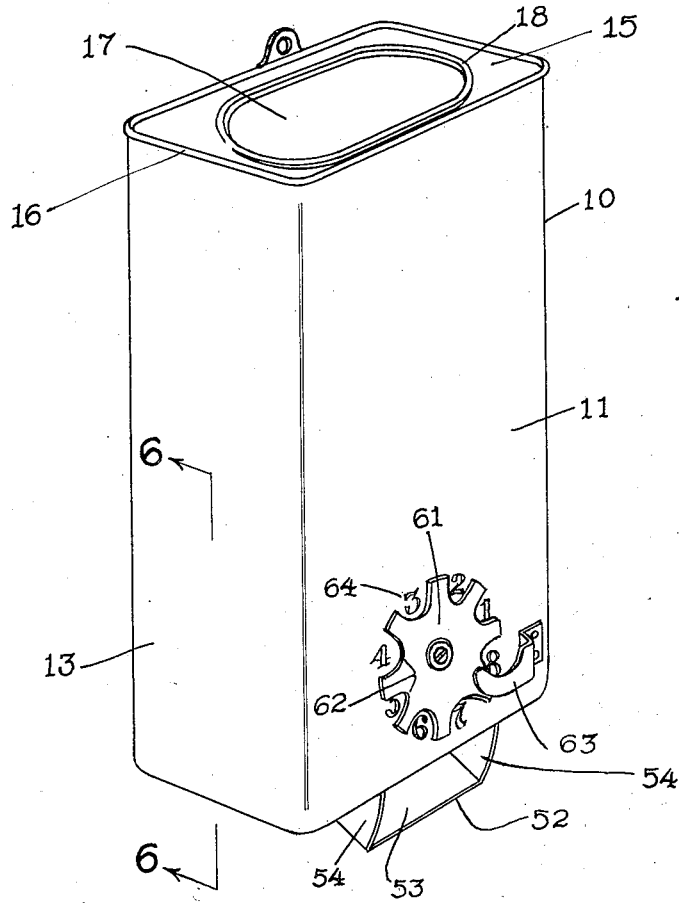
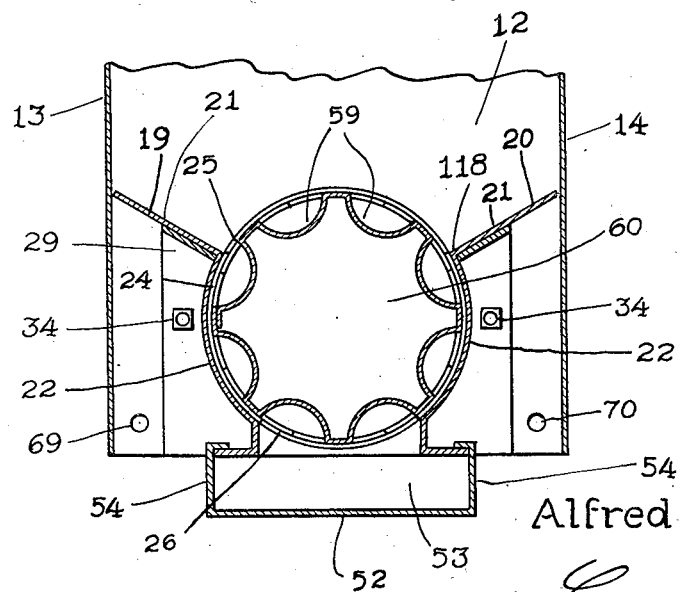
Inventor
Alfred G. Nordmarken
By Caswell & Lagaard
Attorney

Patented Dec. 31, 1935

2,025,821

UNITED STATES PATENT OFFICE 2,025,821

DISPENSING DEVICE

Alfred G. Nordmarken, Minneapolis, Minn., assignor to William Michael Trepanier, Grand Forks, N. Dak.

Application July 26, 1933, Serial No. 682,240

8 Claims. (Cl. 221—106)

My invention relates to dispensing devices and has for its object to provide a dispensing device by means of which the contents of a container may be quickly and accurately measured and dispensed, as desired.

Another object of the invention resides in providing a dispensing device including a container and a hopper bottom therefor having an opening through the same through which the contents of the container may be discharged.

A feature of the invention resides in providing a revoluble member set into said hopper bottom and provided with a pocket adapted to receive a portion of the contents of the container, and to discharge the same through the opening in said hopper bottom.

A still further object of the invention resides in providing abutments on the revoluble member for cooperation with corresponding stops on the hopper bottom to limit the movement of the revoluble member.

An object of the invention resides in constructing the hopper bottom with a cylinder in which the revoluble member is rotatable, said cylinder having an opening at the top and another opening in the bottom thereof with which the pocket in the revoluble member may alternately register.

A feature of the invention resides in constructing the hopper bottom in two parts, each having an inclined portion and a circular portion.

Another object of the invention resides in disposing the cylinder between the circular portions of the parts of the hopper bottom.

An object of the invention resides in providing the circular portion on the hopper bottom with outwardly disposing flanges at the lowermost edges thereof.

A still further object of the invention resides in disposing the revoluble member near the lower edges of the walls of the container and in arranging the spout below said edges.

A feature of the invention resides in hingedly connecting the spout to the hopper bottom so that the spout may swing upwardly and out of the way when not in use.

Another object of the invention resides in constructing the spout with inwardly turned flanges adapted to cooperate with the flanges of the hopper bottom and supporting the spout on the hopper bottom.

A feature of the invention resides in arranging the spout to cause the same to discharge forwardly of the container.

Other objects of the invention reside in the novel combination and arrangement of parts and in the details of construction hereinafter illustrated and/or described.

In the drawings:

Fig. 1 is a perspective view of a dispensing device illustrating an embodiment of my invention.

Fig. 2 is a fragmentary longitudinal sectional view taken on line 2—2 of Fig. 1.

Fig. 3 is a longitudinal sectional view taken on line 3—3 of Fig. 2.

Fig. 4 is a perspective view of the hopper bottom and measuring device of the invention removed from the container.

Fig. 5 is a view similar to Fig. 1 illustrating a modification of the invention.

Fig. 6 is a longitudinal sectional view taken on line 6—6 of Fig. 5.

Fig. 7 is a detail sectional view of the spout hinge.

My invention proper comprises a container which is indicated in its entirety by the reference numeral 10. The particular construction of the container forms no feature of the invention and any container may be used in place of the one shown. The container shown is constructed of cardboard or other similar material which is bent at the corners to form a front wall 11, a rear wall 12 and side walls 13 and 14. These walls are connected together at their upper ends through a top 15 which is crimped along its edge 16 over the upper ends of the walls of the container so as to hold the said top securely attached thereto. The top 15 is constructed with an opening through which the contents of the container may be received, which opening is closed through a closure 17 illustrated in Fig. 1. The closure 17 may be constructed with a flange 18 by means of which the same can be pried open or the said closure may be constructed in any other suitable manner. The lower end of the container 10 is open as best shown in Fig. 3 and is provided with a hopper bottom 118 which serves as a closure for the same.

The hopper bottom 118 is constructed with two parts 19 and 20, each of which is provided with an inclined portion 21 and an arcuate portion 22 depending therefrom. The inclined portions 21 are constructed with curved corners 23 so that the same fit snugly within the corners of the container 10 when the hopper bottom is applied thereto. Between the two arcuate portions 22 of the parts 19 and 20 of the hopper bottom 21 is disposed a cylinder 24 which is open at its ends. This cylinder is constructed with two openings 25 and 26. The opening 25 is disposed at the upper portion of the cylinder and extends to within a short distance of each end of the cylinder, leaving two connecting portions 27 and 28 connecting the major portions of the cylinder together. Opening 26 is constructed in like manner and is disposed on the underside of the cylinder 24 immediately below the opening 25. The cylinder 25 may be secured to the two parts 19 and 20 of the hopper bottom 118 in any suitable manner as by soldering, spot welding, or otherwise.

The hopper bottom 118 is attached to the walls of the container 10 in the following manner: At the ends of the parts 19 and 20 of the hopper bottom are provided two end plates 29 and 30 which are formed with flanges 31 lying along the undersides of the inclined portions 21 of the hopper bottom. These flanges are spot welded or riveted or otherwise secured to the inclined portion 21 and are constructed with parts 32 (Fig. 2) which overlie the ends of the cylinder 24. The plates 29 and 30 may be soldered to the cylinder proper as well as to the inclined portions 21 of the hopper bottom. The two plates 29 and 30 are used for attaching the entire structure to the container proper. For this purpose, holes 33 are formed in the plates 29 and 30 and suitable rivets or bolts 34 extend through said plates and the front and rear walls 11 and 12 of the container proper. By means of this construction, the hopper bottom is held in proper position within the container with the edges thereof in contact with the walls of the container so as to form a tight seal therebetween to prevent the escape of the contents of the container between said walls and hopper bottom.

Within the cylinder 24 is rotatably mounted a measuring device 35. This device consists of a tube 36 formed from sheet metal which is bent to provide two pockets 37 and 38 diametrically opposite one another. In the ends of tube 36 are disposed end plates 39 and 40 which are constructed with flanges 41 by means of which the said end plates may be attached to the said tube. These parts may be soldered, welded or otherwise secured together. The cylinder 24 forms the bearing in which the measuring device 35 is journaled. The two plates 29 and 30 serve to retain the measuring device within the cylinder 24 preventing endwise movement of the said member with respect to said cylinder.

For the purpose of rotating the revoluble member 35 the end plate 40 is constructed with a boss 42 which is riveted to said end plate and which extends outwardly through an opening 43 in the portion 32 of end member 30. This boss is constructed at its end with a shouldered stud 44 adapted to receive a lever 45 having a proper shaped hole formed therein to fit over said stud. The stud 44 is preferably constructed with sides so as to prevent rotation of the lever with respect to the revoluble member proper. Lever 45 is attached to the boss 42 through a screw 46 which is threaded into said boss. A washer 47 encircles the screw 46 and operates to clamp the said lever against the shoulder formed on the boss 42. At the end of the lever 45 is provided a knob 48 by means of which the revoluble member 35 may be rotated.

As will be noted in Fig. 3 the revoluble member 35 is constructed with the two pockets 37 and 38. These pockets are diametrically opposite one another and when pocket 37 is in register with opening 25, pocket 38 is in register with opening 26. The revoluble member 35 may be turned until the pocket 37 comes into register with opening 26 and pocket 38 comes into register with opening 25. To limit the movement of the revoluble member when the pockets come in such position, a circumferentially extending slot 49 is provided in the end of the cylinder 24 and in the arcuate portion 22 of the parts 19 and 20 of the hopper bottom 18. A lug 50 formed on the end of the revoluble member 35 is adapted to travel along said slot. When said lug reaches the ends of said slot the same strikes the abutting shoulder formed thereby which I have indicated by the reference numeral 51 which limits the movement of the revoluble member and causes the respective pockets to come to rest in register with the openings 25 and 26 in the cylinder 24.

For the purpose of collecting the contents of the container discharged by the measuring device 35, a spout 52 is employed which is constructed with an inclined bottom 53 and upwardly extending sides 54. Sides 54 terminate in inwardly turned flanges 55 which are adapted to rest upon complemental flanges 56 formed at the lowermost edges of the arcuate portions 22 of the hopper bottom 118. The spout 52 is open at the forward portions thereof and when applied to the hopper bottom 118 operates to direct the substance discharged through opening 26 forwardly where the same may be received in a suitable receptacle placed at the proper location for the purpose. The spout 52 is hingedly connected to the hopper bottom 118 as best shown in Figs. 4 and 7. Near the rearward ends of the flanges 56 are formed recesses or openings 66. Tongues 67 struck out of the end of the flanges 55 are received within these openings and cooperate therewith to hingedly connect the parts together. When the container is raised the spout 52 drops downwardly as shown in Fig. 1 where the same functions to discharge the portion of the contents of the container delivered by the measuring device 35. When the container is set down upon a table, spout 52 is swung about the tongues 67 which serve as hinges and caused to extend within the space at the bottom of the container as shown in dotted lines in Fig. 7. In such position, the spout forms a closure for the opening through the hopper bottom.

The device is best mounted on a wall of the room in which it is to be used. For this purpose an eyelet 68 is employed which is attached to the rear wall 12 and projects upwardly beyond the same. In addition two holes 69 and 70 are drilled in the wall 12. Screws can be inserted into these holes and screwed into the support to hold the device rigidly mounted. If desired, the container may be used as a portable device. In such case, the spout is retracted into the container when the container is stood on end.

The use of my invention is as follows: The container is first filled with the commodity desired to be dispensed. The same falls upon the hopper bottom 18 and gradually slides toward the opening 25 in the cylinder 24. When the lever 45 is in either of its extreme positions, one or the other of the two pockets 37 or 38 is in register with the opening 25. The commodity may then fall into the said pocket. As the revoluble member 35 is rotated through an angle of 180 degrees the previously filled pocket is emptied through the opening 26 into the spout 52 where the contents may be discharged from the forward end of the spout. When the discharging pocket is in such position the other pocket is in the position to receive another charge of the commodity. Rotation of the lever 45 in the opposite direction will bring the last named pocket into register with opening 26 thereby successively discharging quantities of the commodity from the two pockets by alternate reciprocation of the lever 45 in opposite directions to the end of its path of movement as determined by the slot 49 and stop 50.

In Figs. 5 and 6 I have shown a slight modification of the invention. In general the construction of the container, hopper bottom and the revoluble member is the same, and like reference numerals will be utilized to indicate corresponding parts. The revoluble member which is indicated at 60 is somewhat differently constructed than the revoluble member 36, being formed with a plurality of pockets 59, preferably with as many as six or eight pockets. These pockets when the revoluble member is rotated are adapted to successively come into register with the respective openings 25 and 26 in the cylinder 24, whereby the commodity contained therein is delivered to spout 52 and discharged from the device. For operating the revoluble member 60 a dial 61 is employed instead of the lever 45. This dial is attached to the boss secured to the revoluble member in exactly the same manner as previously described. The dial 61 is constructed with a number of notches therein indicated at 62, which notches correspond in number to the number of pockets in said revoluble member. Attached to the wall 11 of case 10 is a stop 63 which lies in the path of movement of the various notches 62. By means of said stop and notches the dial can be turned various fractional parts of a revolution so as to procure the delivery of a whole number of pockets full. Upon the front 11 of the container 10 are painted numerals 64 which state the number of pockets to be discharged upon rotation of the dial from such position to the stop 63. In operation the forefinger is inserted in the notch registering with the desired numeral and the dial 61 turned to the right until the forefinger engages stop 63.

My invention is highly advantageous in that an extremely simple and practical device is provided whereby measured quantities of the commodity may be readily segregated from the mass and dispensed. The construction of the device is such that a paper container may be used, thereby greatly reducing the expense of construction. With either form of the invention repeated discharge of the product from the device may occur by proper manipulation of the lever or the dial. When the revoluble member is left in either of its positions it forms a means for closing the opening in the hopper bottom and prevents loss of the contents of the container or the loss of aroma or flavor of the substance contained in the container. My invention is exceedingly simple to operate and can be constructed at an extremely low cost.

Changes in the specific form of my invention, as herein disclosed, may be made within the scope of what is claimed without departing from the spirit of my invention.

Having described my invention, what I claim as new and desire to protect by Letters Patent is:

1. In a dispensing device, a container, a hopper bottom comprising two parts, each constructed with an inclined portion and a circular portion connected therewith, a cylinder disposed between said circular portions and having openings at the top and bottom thereof, a measuring device revoluble within said cylinder and having a pocket adapted to register with either of said openings, the lower ends of said arcuate portions of the hopper bottom being constructed with outwardly turned flanges and a spout having inwardly turned flanges adapted to cooperate with said outwardly turned flanges to hold the spout attached to said hopper bottom.

2. In a dispensing device, a container, a hopper bottom comprising two parts, each constructed with an inclined portion and a circular portion connected therewith, a cylinder disposed between said circular portions and having openings at the top and bottom thereof, a measuring device revoluble within said cylinder and having a pocket adapted to register with either of said openings, the lower ends of said arcuate portions of the hopper bottom being constructed with outwardly turned flanges, a spout having inwardly turned flanges adapted to cooperate with said outwardly turned flanges to hold the spout attached to said hopper bottom, and means for hingedly connecting said flanges together at the rearward ends thereof.

3. In a dispensing device, a container, a hopper bottom comprising two parts, each constructed with an inclined portion and a circular portion connected therewith, a cylinder disposed between said circular portions and having openings at the top and bottom thereof, a measuring device revoluble within said cylinder and having a pocket adapted to register with either of said openings, the lower ends of said arcuate portions of the hopper bottom being constructed with outwardly turned flanges and a spout having inwardly turned flanges adapted to cooperate with said outwardly turned flanges to hold the spout attached to said hopper bottom, one set of said flanges having openings therein at corresponding ends thereof, and the other flanges having tongues thereon entering said openings for hingedly connecting the spout to the hopper bottom.

4. In a dispensing device, a container having a vertical wall structure formed with a free lower edge adapted to rest upon a supporting surface for the container, a hopper within the container positioned above the free edge of the wall structure, a spout positioned within said container below said hopper, means for pivotally supporting one end of said spout on said container, said spout being movable to bring the free edge thereof above the lower edge of the container to cause the container to rest upon said free edge of the container and being movable to a position below the free edge of the container to discharge from the container, and a measuring device for discharging from the hopper to said spout.

5. In a dispensing device, a container, a hopper bottom having two inclined walls, a cylinder open at its ends and attached to the inclined walls of the hopper bottom, said cylinder having two openings therein, one of said openings being in communication with said hopper bottom, end plates secured to the inclined walls of the hopper bottom, means for securing said end plates to the walls of the container for supporting the hopper bottom in the container, said end plates extending across the open ends of the cylinder and closing the same and a movable member within said cylinder for discharging from the opening in the cylinder communicating with the hopper bottom to the other opening in the cylinder.

6. In a dispensing device, a container, a hopper bottom therefor, said hopper bottom being constructed with two outwardly turned flanges, a spout having inwardly turned flanges adapted to cooperate with said outwardly turned flanges to hold the spout attached to said hopper bottom, means for pivotally connecting said spout to said hopper bottom, and a measuring device for discharging from said hopper bottom to said spout.

7. In a dispensing device, a container, a hopper bottom therefor, said hopper bottom being constructed with two outwardly turned flanges, a spout having a bottom, side walls connected thereto, two inwardly turned flanges connected to said side walls and extending angularly therefrom, said last named flanges being adapted in one position to rest upon the flanges of said hopper bottom for supporting the spout in inclined relation, said second named flanges being movable away from said first named flanges to bring the bottom of the hopper in engagement with the first named flanges, means for hingedly connecting said spout to said hopper, and a measuring device for discharging from said hopper to said spout.

8. In a dispensing device, a container, a hopper bottom therefor, said hopper bottom being constructed with two outwardly turned flanges, a spout having inwardly turned flanges adapted to cooperate with said outwardly turned flanges to hold the spout attached to said hopper bottom, recesses formed in certain of said flanges, tongues formed on the other of said flanges and cooperating with said recesses to pivotally connect said spout to said hopper bottom, and a measuring device for discharging from said hopper bottom to said spout.

ALFRED G. NORDMARKEN.